United States Patent
Maguire

(10) Patent No.: US 10,433,215 B2
(45) Date of Patent: Oct. 1, 2019

(54) METHOD FOR CONTROLLING MULTIPOINT TCP IN WIRELESS COMMUNICATIONS NETWORKS AND DEVICES FOR USE THEREIN

(71) Applicant: Telefonaktiebolaget LM Ericsson (publ), Stockholm (SE)

(72) Inventor: Patrick Maguire, Westmeath (IE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 15/541,082

(22) PCT Filed: Jan. 6, 2015

(86) PCT No.: PCT/EP2015/050121
§ 371 (c)(1),
(2) Date: Jun. 30, 2017

(87) PCT Pub. No.: WO2016/110318
PCT Pub. Date: Jul. 14, 2016

(65) Prior Publication Data
US 2017/0374584 A1    Dec. 28, 2017

(51) Int. Cl.
*H04W 36/00* (2009.01)
*H04W 76/34* (2018.01)
(Continued)

(52) U.S. Cl.
CPC ......... *H04W 36/0027* (2013.01); *H04L 69/14* (2013.01); *H04L 69/163* (2013.01);
(Continued)

(58) Field of Classification Search
CPC H04W 36/0027; H04W 36/005; H04L 69/14; H04L 69/163; H04L 69/165
See application file for complete search history.

(56) References Cited

U.S. PATENT DOCUMENTS

2012/0023189 A1* 1/2012 Giaretta ............... H04W 48/18
709/217
2013/0208713 A1 8/2013 Hamade et al.
(Continued)

FOREIGN PATENT DOCUMENTS

| EP | 2 753 124 A1 | 7/2014 |
|---|---|---|
| WO | 2013 061115 A1 | 5/2013 |

OTHER PUBLICATIONS

International Search Report for International application No. PCT/EP2015/050121—dated Sep. 8, 2015.
(Continued)

*Primary Examiner* — Albert T Chou
(74) *Attorney, Agent, or Firm* — Patent Portfolio Builders, PLLC

(57) ABSTRACT

A method in a wireless terminal operating in a 3GPP wireless communications network for controlling using MPTCP with a WLAN network, The method comprises receiving from the 3GPP wireless communications network system information comprising a condition for MPTCP with a WLAN network, the condition being associated with mobility characteristics of the wireless terminal. The method further comprises determining a parameter indicative of mobility characteristics of the wireless terminal and disabling MPTCP with a WLAN network if the parameter indicative of mobility characteristics indicates that mobility of the wireless terminal is at or above a value defined in the condition.

15 Claims, 5 Drawing Sheets

(51) Int. Cl.
*H04L 29/06* (2006.01)
*H04W 36/16* (2009.01)
*H04W 36/32* (2009.01)
*H04W 76/40* (2018.01)
*H04W 80/06* (2009.01)
*H04W 88/06* (2009.01)

(52) U.S. Cl.
CPC ..... *H04W 36/005* (2013.01); *H04W 36/0066* (2013.01); *H04W 36/165* (2013.01); *H04W 36/32* (2013.01); *H04W 76/34* (2018.02); *H04W 76/40* (2018.02); *H04W 80/06* (2013.01); *H04W 88/06* (2013.01)

(56) References Cited

U.S. PATENT DOCUMENTS

| | | | | |
|---|---|---|---|---|
| 2014/0080484 | A1* | 3/2014 | Centonza | H04W 36/24 455/450 |
| 2014/0192643 | A1* | 7/2014 | Kalapatapu | H04W 48/00 370/230 |
| 2016/0255551 | A1* | 9/2016 | Susitaival | H04W 36/023 370/334 |

OTHER PUBLICATIONS

3GPP TS 23.234 v12.0.0; Technical Specification; 3rd Generation Partnership Project; Technical Specification Group Services and System Aspects; 3GPP system to Wireless Local Area Network (WLAN) interworking; System description (Release 12)—Sep. 2014.

3GPP TS 36.304 v12.2.0; Technical Specification; 3rd Generation Partnership Project; Technical Specification Group Radio Access Network; Evolved Universal Terrestrial Radio Access (E-UTRA); User Equipment (UE) procedures in idle mode (Release 12)—Sep. 2014.

3GPP TS 22.234 v12.0.0; Technical Specification; 3rd Generation Partnership Project; Technical Specification Group Services and System Aspects; Requirements on 3GPP system to Wireless Local Area Network (WLAN) interworking (Release 12)—Sep. 2014.

3GPP TSG RAN WG2 Meeting #87bis; Shanghai, China; Change Request; Title: Correction to RAN rules for UEs in high mobility state; Source to WG: Intel Corporation; Source to TSG: R2 (R2-144219)—Oct. 6-10, 2014.

Office Action issued in application No. 15700094.4, dated Sep. 18, 2018; 6 pages.

* cited by examiner

TCP network stack                TCP network stack

METHOD FOR CONTROLLING MULTIPOINT TCP IN WIRELESS COMMUNICATIONS NETWORKS AND DEVICES FOR USE THEREIN

PRIORITY

This nonprovisional application is a U.S. National Stage Filing under 35 U.S.C. § 371 of International Patent Application Serial No. Pct/Ep2015/050121 filed Jan. 6, 2015, and entitled "A Method for Controlling Multipoint TCP in Wireless Communications Networks and Devices for Use Therein."

TECHNICAL FIELD

The present invention relates to wireless communications networks, in general, and in particular to controlling a mobile terminal using multipoint transmission control protocol (MPTCP).

BACKGROUND

With the advent of internet in mobile communications networks the networks more and more are used for providing data based services. Streaming video clips to mobile phones or tablets, voice over IP calls and regular internet browsing are now possible on mobile devices. Wireless communications networks based on 3rd-Generation Partnership Project (3GPP) technologies (these include radio-access technologies known as Long Term Evolution (LTE), Long Term Evolution Advanced (LTE Advanced), Universal Mobile Telecommunications System/Wideband Code-Division Multiple Access (UMTS/WCDMA), and Global System for Mobile Communications (GSM)) have limited bandwidth and the ever-increasing number of mobile devices capable of using data services results in dramatic increase of mobile data consumption.

In search for additional bandwidth, wireless network operators turned their attention to WiFi which is widely used in Wireless Local Area Networks (WLAN). The network operators and suppliers of network equipment considered the possibility of using WiFi for purposes extending beyond the role of indoor access to broadband services. Smartphones and other devices (referred to hereinafter as "user equipment," or "UE") using 3GPP access networks are today equipped with WiFi interface. Initially this WiFi capability of smartphones was intended for accessing Internet and other data services when the user was indoor where he or she had access to a WiFi network. The decision to switch data connection to WiFi is made in these devices without support from the 3GPP network. The UE detects WiFi network and switches data connection from the 3GPP network to the WiFi network if it is authorised to use said WiFi network. This switch have a character of a handover in the sense that the data connection delivered to a smartphone over 3GPP interface is moved to WiFi interface when the smartphone is in the range of a WiFi network which it is allowed to use. In consequence the data is transmitted over the WiFi interface instead of the 3GPP interface. These WLAN networks in user's homes or offices are not really part of the wireless communications network controlled by the operator. They are private networks that can support individual users rather than wider public.

To address the growing demand for increased network data capacity, operators are leveraging on WiFi coupled with their macro/pico cell deployments to enable capacity offload in a cost effective manner. From the operator's perspective switching from 3GPP access to WiFi access networks brings number of benefits:
  WiFi operates on free (i.e. unlicensed) spectrum, which means there is no need for expensive and time consuming work needed to satisfy legal regulations.
  WiFi offers huge network capacity boost.
  Simplified network procurement processes, this is partly related to WiFi operating on unlicensed spectrum.
  Lower Capex investment required compared to other solutions (e.g. so called micro and pico cells).

The above described 3GPP-WLAN system interworking is a technique defined as a wireless IP connectivity service where the user obtains access via a Wireless LAN technology instead of via 3GPP access network. It shall be possible to deploy the WLAN as an integral part of the 3GPP system or the two systems can be separate. The 3GPP system shall be capable of interworking with one or more WLANs and a WLAN shall be capable of interworking with one or more 3GPP systems. More details on 3GPP system to Wireless Local Area Network (WLAN) interworking can be found in 3GPP TS 22.234 V12.0.0 and 3GPP TS 23.234 V12.0.0.

There is known a solution for supporting handover from a WiMax network to a WLAN network as disclosed in Korean patent application KR1020080056914. In this solution the mobile terminal receives from the WiMax network information about WLAN AP (access point) installation density and if the WLAN AP installation density is below some reference value the WLAN interface is turned off in the mobile terminal. This solution is focused on minimising power consumption by turning off the WLAN interface when it is unlikely that the mobile terminal enters into a range of WLAN AP (the decision to turn off WLAN interface is based on combination of installation density and the speed of the mobile terminal).

There is also known a solution for controlling operation of a WLAN interface in a mobile terminal as disclosed in patent application US2011/0171909A1. In this solution the mobile terminal knows locations of WLAN Access Points, determines its own location and switches on the WLAN interface if it is located in a range (or close to) one of the known WLAN Access Points.

There is also known a technique called multipoint traffic control protocol (MPTCP) where two or more TCP connections run in parallel between User Equipment and the internet. In this way the bandwidth available to the UE is increased by the plurality of connections. Multipath TCP aggregates a set of TCP connections (sub-flows) and distributes load on all interfaces. An example illustration of network stacks of TCP and MPTCP is shown in FIG. 9 and an example of a plurality of TCP flows forming MPTCP connection is shown in FIG. 10.

SUMMARY

According to a first aspect of the present invention there is provided a method in a wireless terminal operating in a 3GPP wireless communications network for controlling using multipoint traffic control protocol, MPTCP with a wireless local area network, WLAN. The method comprises receiving from the 3GPP wireless communications network system information comprising a condition for MPTCP with a WLAN network, the condition being associated with mobility characteristics of the wireless terminal. The method further comprises determining a parameter indicative of mobility characteristics of the wireless terminal and disabling MPTCP with a WLAN network if the parameter indicative of mobility characteristics indicates that mobility of the wireless terminal is at or above a value defined in the condition.

According to a second aspect of the present invention there is provided a method in a node of a 3GPP wireless communications network for controlling a wireless terminal operating in the 3GPP wireless communications network and using multipoint traffic control protocol, MPTCP with a Wireless Local Area Network, WLAN. The method comprises the operations of setting a condition for MPTCP with a WLAN network, the condition being associated with mobility characteristics of the wireless terminal and adding said condition for MPTCP with a WLAN network to system information. The method further comprises sending said system information to a wireless terminal, wherein said condition associated with mobility characteristics causes disabling MPTCP with a WLAN network if a parameter indicative of mobility characteristics of the wireless terminal indicates that mobility of the wireless terminal is at or above a value defined in the condition.

According to a third aspect of the present invention there is provided a wireless terminal for a 3GPP wireless communications network, the wireless terminal comprising a processor and a memory. Said memory contains instructions executable by said processor whereby said wireless terminal is configured to receive system information comprising a condition for the wireless terminal using multipoint traffic control protocol, MPTCP with a wireless local area network, WLAN, the condition being associated with mobility characteristics of the wireless terminal. Further the wireless terminal is configured to determine a parameter indicative of mobility characteristics of the wireless terminal and to disable MPTCP with a WLAN network if the parameter indicative of mobility characteristics indicates that mobility of the wireless terminal is at or above a value defined in the condition.

According to a fourth aspect of the present invention there is provided a node for a 3GPP wireless communications network, the node being configured for controlling a wireless terminal operating in the 3GPP wireless communications network and using multipoint traffic control protocol, MPTCP with a Wireless Local Area Network, WLAN. The node comprises a processor and a memory. Said memory contains instructions executable by said processor whereby said node is configured to set a condition for MPTCP with a WLAN network, the condition being associated with mobility characteristics of the wireless terminal and to add said condition for MPTCP with a WLAN network to system information. Further, said node is configured to send said system information to a wireless terminal, wherein said condition associated with said mobility characteristics causes disabling MPTCP with a WLAN network if a parameter indicative of mobility characteristics of the wireless terminal indicates that mobility of the wireless terminal is at or above a value defined in the condition.

According to a fifth aspect of the present invention there is provided a wireless terminal for a 3GPP wireless communications network, the wireless terminal comprising a receiving module for receiving system information. The system information comprises a condition for the wireless terminal using multipoint traffic control protocol, MPTCP with a wireless local area network, WLAN. The condition is associated with mobility characteristics of the wireless terminal. The wireless terminal also comprises a determining module for determining a parameter indicative of mobility characteristics of the wireless terminal and a checking module for checking if the determined parameter indicative of mobility characteristics of the wireless terminal meets the condition for MPTCP with a WLAN network. Further, the wireless terminal comprises a control module for disabling MPTCP with a WLAN network if the parameter indicative of mobility characteristics indicates that mobility of the wireless terminal is at or above a value defined in the condition.

According to a sixth aspect of the present invention there is provided a node for a 3GPP wireless communications network, the node being configured for controlling a wireless terminal operating in the 3GPP wireless communications network and using multipoint traffic control protocol, MPTCP with a Wireless Local Area Network, WLAN. The node comprises a setting module for setting a condition for MPTCP with a WLAN network associated with mobility characteristics of a wireless terminal and an adding module for adding the condition for MPTCP with a WLAN network to system information. The node further comprises a sending module for sending said system information to a transceiver of the node for wireless transmission to a wireless terminal, wherein said condition associated with said mobility characteristics causes disabling MPTCP with a WLAN network if a parameter indicative of mobility characteristics of the wireless terminal indicates that mobility of the wireless terminal is at or above a value defined in the condition.

Further features of the present invention are as claimed in the dependent claims.

Advantageously the invention allows for optimization of user experience and minimization of network signalling load for wireless terminals which are classified as Fast Moving Mobiles (FFM) as determined by operator, when transitioning in and out of WLAN coverage while connected to a 3GPP radio access network. Fast Moving Mobiles are wireless mobile devices that travel across the network at a speed that causes frequent handover operations.

BRIEF DESCRIPTION OF THE DRAWINGS

The present invention will be understood and appreciated more fully from the following detailed description taken in conjunction with the drawings in which.

DETAILED DESCRIPTION

Figure 1:
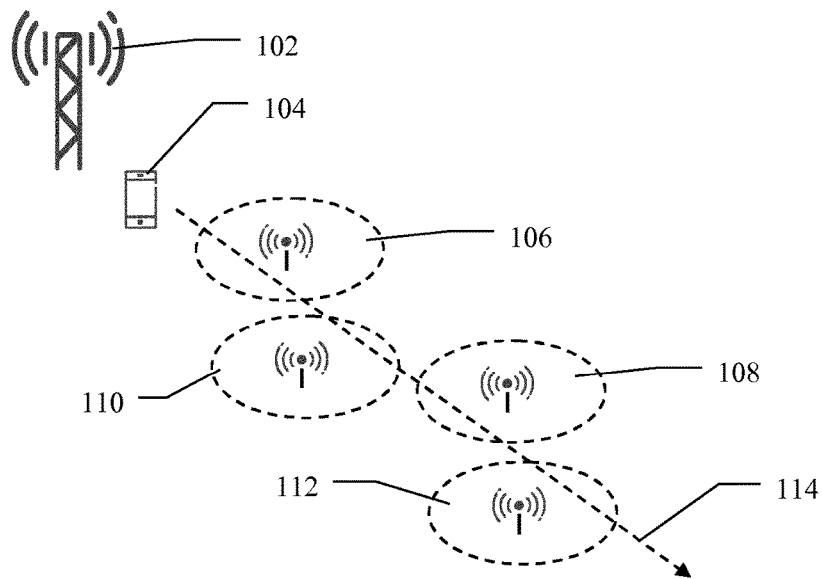
FIG. 1 is a diagram illustrating a wireless terminal travelling through a 3GPP cell with WLAN networks overlapping the 3GPP cell.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The term "wireless terminal" used in this document refers to devices also known as user equipment (UE) that communicate via a radio access network (RAN) with one or more core networks. As used herein, a wireless terminal can include any device that communicates through a wireless channels with a communication network, and may include, but is not limited to, a mobile telephone ("cellular" telephone), laptop computer, tablet computer, game console, and/or a machine-type communications (MTC) device. The wireless terminals described in this document are also capable of communicating with a wireless local access network (WLAN).

The inventor has recognised that MPTCP based on 3GPP and WLAN connectivity is advantageous and can be further improved for the so called Fast Moving Mobiles given the relatively short range of a radio signal provided by a WLAN access point. Currently, in deciding to establish a parallel connection to a WLAN access network, no consideration is made for the mobility characteristics of the mobile terminal. The MPTCP based on 3GPP and WLAN connections can be further improved if mobility characteristic of the wireless terminal is taken into account in a way that prevents the Fast Moving Mobiles from establishing MPTCP connections with a WLAN access network.

It must be noted that the solution disclosed in KR1020080056914 is not concerned with MPTCP at all but with vertical handover (i.e. handover of data connection between two different technologies). Moreover, the solution disclosed in KR1020080056914 is based on the assumption that with increased speed of the mobile terminal the mobile terminal more often will be in range of a WLAN Access Points and therefore handover to these Access Points should be allowed. The present invention in its embodiments considers frequent connections and disconnections to WLAN Access Points as a problem resulting in excessive signaling and increased battery consumption and teaches a solution in which the network provides conditions for MPTCP with WLAN network based on mobility characteristics of the wireless terminal. In the solution based on embodiments of the present invention MPTCP with WLAN network is disabled for wireless terminals with high mobility.

In US2011/0171909A1 a mobile terminal is equipped with a WLAN interface and the solution disclosed in this document teaches switching on and off the WLAN interface depending on location of the mobile terminal relative to location of a WLAN Access Point. Motion sensor in the mobile terminal is used to support the decision on switching on/off the WLAN interface: switching off or keeping it switched off if the mobile terminal is motionless and away from one of the WLAN Access Points and switching on the WLAN interface if the mobile terminal is in motion.

Neither of these two solutions acknowledges and addresses the problem of frequent connections and disconnections to WLAN networks caused by the mobile terminal moving, on the contrary both these solutions see the motion of the mobile terminal as an opportunity to connect to another WLAN network.

There is also known a solution for controlling 3GPP-WLAN interworking as described in an international patent application PCT/EP2013/070381, but interworking is based on handing over data connection from 3GPP connection to WLAN connection in such a way that all data transfer is moved from the 3GPP connection to the WLAN connection. In multipoint TCP both 3GPP and WLAN connections are active in parallel so there is no handover taking place.

In the deployment scenario of 3GPP and WiFi access networks, as shown in FIG. 1, where the wireless terminal 104 is not stationary the outcome of moving from 3GPP 102 to WiFi 106-112 is illustrated. Giving consideration to the fact that the geographical coverage of a WiFi Access Points (AP) 106-112 is small (approx. 100 m in open space) and the fact that wireless terminal 104 travels 114 (e.g. in a car) the result will be a WiFi AP ping-pong due to mobility of the wireless terminal—the wireless terminal stays in the range of a particular WLAN access point (AP) for a very short period of time. This, in turn leads to:

increased signaling;
increased battery consumption;
poor user experience.

Figure 2:
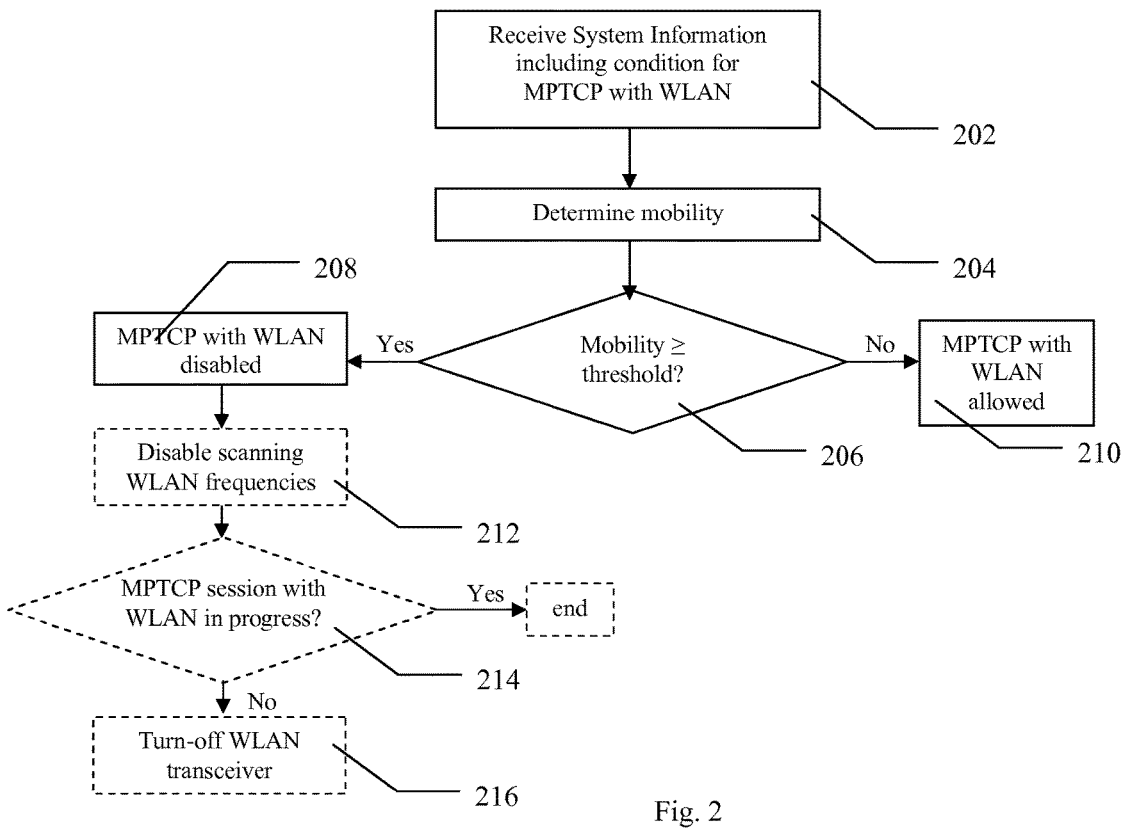
FIG. 2 is a diagram illustrating a method in a wireless terminal for controlling use of MPTCP with a WLAN network in one embodiment of the present invention.

With reference to FIG. 2 an embodiment of a method for controlling use of MPTCP with a WLAN network is described. The method is implemented in a wireless terminal operating in a 3GPP network that also comprises a WLAN interface that may be used for establishing a MPTCP connection comprising parallel 3GPP and WLAN data connections. In operation, the wireless terminal receives, 202, system information comprising a condition for MPTCP with a WLAN network and this condition is associated with mobility characteristics of the wireless terminal. Once the condition is received the wireless terminal determines, 204, a parameter indicative of its mobility characteristics. If the parameter indicative of mobility of the wireless terminal does not meet the condition, 206, then MPTCP with a WLAN network is not allowed and the mobile terminal disables 208 MPTCP with a WLAN network. In simple terms, failing to meet the condition means that mobility of the wireless terminal is at or above a value defined in the condition. Otherwise, if the condition is met, then MPTCP with a WLAN network is allowed, 210, and the wireless terminal may connect to WLAN network establishing a parallel connection to the existing 3GPP connection if it is in a range of a WLAN Access Point.

In a preferred embodiment the parameter indicative of mobility of the wireless terminal is determined based on 3GPP Technical Specification 36.304 V12.2.0. This document introduces and defines three states of mobility of a wireless terminal: Normal, Medium and High. Mobility is determined based on a number of cell reselections during a defined period of time. If the number of cell reselections during this defined period of time does not exceed a first defined value T1 then the mobility of this wireless terminal is Normal. If the number of cell reselections is above T1 but does not exceed a second defined value T2 then the mobility of the wireless terminal is Medium. Finally, if the number of cell reselections is above T2 then the mobility of the wireless terminal is High.

In order to prevent falsifying the counts of cell reselections in the case of the wireless terminals operating close to a border between two adjacent cells the 3GPP 36.304 document explains that consecutive reselections between same two cells shall not be counted into mobility state detection criteria if same cell is reselected just after one other reselection.

Further details of determining mobility characteristics are not subject of the present invention and will not be discussed in this document. However, these details are described in the above identified document and a person skilled in the art would have no problem with implementing these in practice.

An important advantage of using the mobility states of a wireless terminal as defined in 3GPP TS36.304 document is that mechanisms for determining this information are readily available and standardised, which makes implementation of embodiments of the present invention relatively easy. Additionally, determining the mobility characteristics based on specific events in the network as suggested in 3GPP TS36.304 has the advantage that it is not necessary to use GPS data or triangulation in order to determine change of position of the wireless terminal. Using GPS and triangulation may be accurate, but at the same time it consumes battery and computation resources. The present invention inherits these advantages by relying on mobility states as defined in 3GPP 36.304.

In a preferred embodiment in System Information the following additional parameters defining conditions for MPTCP with WLAN network are added to cell information:

UeMobilityMediumMptcpEstablishment [Allowed, Not Allowed]
UeMobilityHighMptcpEstablishment [Allowed, Not Allowed]

Each of these parameters effectively defines a condition for a wireless terminal that received this system information. The condition defines if 3GPP-WLAN multipoint TCP is allowed or not depending on mobility characteristics.

System information (SI) is a general term applicable to information provided to a wireless terminal and this information covers a functional area. System information is sent by the network to the wireless terminal in a structured manner and it consists of many System Information Blocks (messages) known as SIBs. There is a SIB called MIB (Master Information Block), which specifies the structure of the other SIBs. A SIB generally covers a functional area, e.g. system level parameters, cell specific parameters, handover related parameters, etc. More details on system information can be found in 3GPP TS 25.331 V12.3.0 (chapters 8 and 10.2.48).

Among the SIBs defined in TS 25.331 SIB 3 comprises parameters for cell selection and reselection and SIB 4 has parameters for cell selection and reselection specifically for when the wireless terminal is in Connected Mode. For this reason the above parameters defining conditions for 3GPP-WLAN MPTCP are preferably added to SIB 3 or SIB 4. In alternative embodiment the parameters for establishing 3GPP-WLAN MPTCP are added to both SIB 3 and SIB 4. It is, however, possible to include the parameters defining conditions for 3GPP-WLAN MPTCP in other SIBs.

In addition to the information provided to the wireless terminal by the network which enable the wireless terminal to determine if it currently has Normal, Medium or High mobility, the operator can use the above two parameters on a per cell basis to effectively enable or disable 3GPP-WLAN MPTCP based on the mobility state of the wireless terminal.

In one embodiment it is possible to use only one of these MPTCP parameters. For example, if the wireless terminal received UeMobilityMediumMptcpEstablishment [Not Allowed] it would know that MPTCP is not allowed for wireless terminals having mobility characteristics High. However, if 3GPP-WLAN MPTCP is allowed for Medium mobility then both MPTCP parameters are needed if 3GPP-WLAN MPTCP is not allowed for High mobility. In this situation the SIB includes:

UeMobilityMediumMptcpEstablishment [Allowed]
UeMobilityHighMptcpEstablishment [Not Allowed]

In yet another embodiment, when 3GPP-WLAN MPTCP is allowed for Medium mobility and also for High mobility then it is enough to include in the SIB:
UeMobilityHighMptcpEstablishment [Allowed]
because it would be clear that MPTCP for Medium mobility is also allowed.

Similarly, if 3GPP-WLAN MPTCP is not allowed for Medium mobility it is enough to include just one line in the SIB:
UeMobilityMediumMptcpEstablishment [Not Allowed]
because it would be clear that MPTCP for High mobility is not allowed either.

Once the wireless terminal receives the 3GPP-WLAN MPTCP parameter and knows its mobility characteristics it is able to determine if it is allowed or not allowed to establish a MPTCP session using a WLAN network. In this way the wireless terminal can easily avoid connecting to a WLAN network only to be disconnected after a short period of time. This, in consequence, allows for reducing battery consumption, signalling and improves user's experience.

In a preferred embodiment an algorithm operating in the wireless terminal may be as follows:

```
IF
    UE mobility state is NORMAL proceed with MPTCP Establishment
according to standards
    ELSEIF
    UE mobility state is MEDUM and cell parameter
UeMobilityMediumMptcpEstablishment is set to Not Allowed, block
MPTCP establishment
    ELSEIF
    UE mobility state is HIGH and cell parameter
UeMobilityHighMptcpEstablishment is set to Not Allowed, block MPTCP
establishment
    ELSE
    proceed with MPTCP establishment according to standards
    ENDIF
```

In alternative embodiments, however, it is possible that the condition for MPTCP with a WLAN network and its associated mobility characteristics of the wireless terminal is based on velocity of the wireless terminal. In this embodiment the parameter indicative of mobility characteristics of the wireless terminal associated with the received condition is velocity above which MPTCP with a WLAN network is not allowed. The velocity of the wireless terminal may be determined using triangulation, GPS or similar technology (e.g. GLONASS). Depending on embodiment the mobility of the wireless terminal may be characterised by a value taken from a finite set of values (e.g. Normal, Medium or High) or may be a numerical value representing velocity of the wireless terminal. Using the values of Normal, Medium or High as specified in 3GPP Technical Specification 36.304 identified earlier has the advantage that it is very easy to implement because all necessary information is already standardised and available for use.

In further embodiment of the method, if MPTCP with a WLAN network is not allowed, the wireless terminal disables 212 scanning frequencies allocated to WLAN networks (e.g. 2.4 GHz and 5 GHz for WiFi networks). Disabling of the operation of scanning has the advantage of further reduction of battery consumption. If MPTCP with a WLAN network is not allowed the wireless terminal will not connect to a WLAN network even if it is in a range of this WLAN network. If the scanning for available WLANs is disabled resources are freed and less energy is consumed. In yet another embodiment the whole WLAN transceiver is switched off, 216, if the MPTCP with a WLAN network is not allowed.

Disabling scanning and switching off the WLAN transceiver is beneficial when the wireless terminal moves fast and is not allowed to connect to a WLAN network. This, however, is only an optional feature because if the terminal is on a moving train then the mobility characteristics of the wireless terminal determined by 3GPP cell reselections or by ground speed would result in mobility characteristics Medium or High. However, it would be safe to establish MPTCP session with an on-board WLAN network operating on this train. In the scenario with the wireless terminal on board of a train if the wireless terminal knows that the WLAN access point is on-board, and in effect stationary relative to the wireless terminal, then the wireless terminal can override the 3GPP-WLAN MPTCP parameters received in the system information. This specific embodiment requires additional information from the train's WLAN access point identifying said WLAN access point as an on-board access point. In this way the wireless terminal knows it connects to a network on the train.

On the other hand if the wireless terminal has High or Medium mobility because it is in a car on a motorway, and for simplicity it is assumed that there is no WLAN access point in this car, then it is safe to at least switch off scanning of WLAN frequencies or even turn off the WLAN transceiver as discussed earlier.

Preferably, the switching off of the WLAN transceiver (WLAN interface) is conditional. The WLAN transceiver of the wireless terminal is turned off if, 214, the wireless terminal is not connected to any WLAN network.

Figure 3:
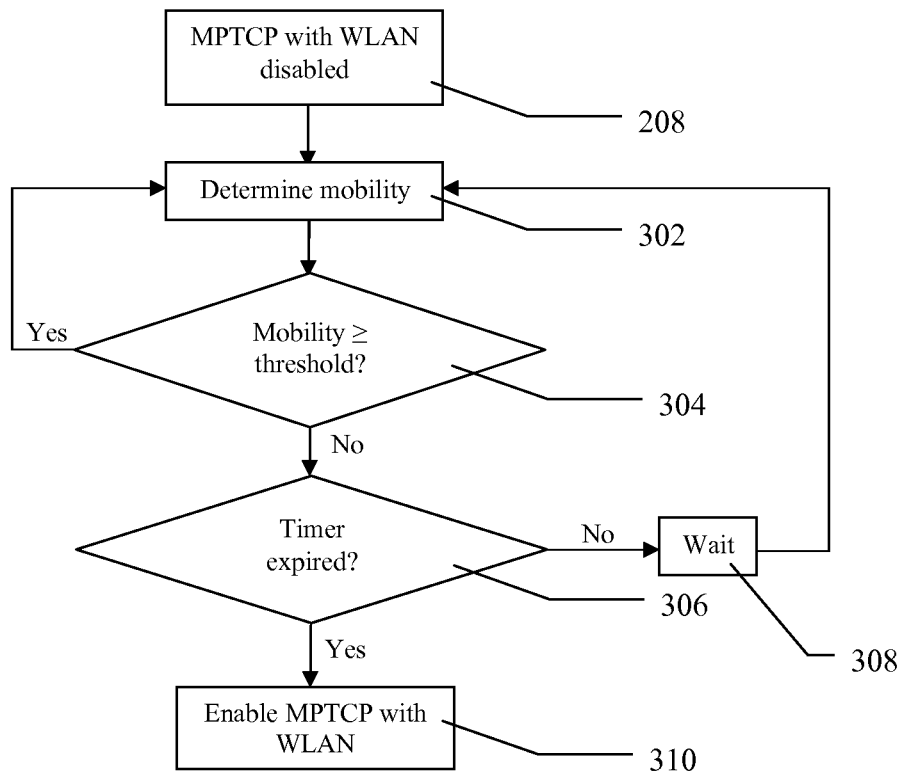
FIG. 3 is a diagram illustrating a method in a wireless terminal for controlling use of MPTCP with a WLAN network in one embodiment of the present invention.

As explained earlier, depending on the current mobility characteristics of the wireless terminal MPTCP with a WLAN network may be allowed or not allowed and the wireless terminal may transition between these states in response to its changing mobility characteristics. As illustrated in FIG. 3, preferably, transition from a state in which MPTCP with a WLAN network is not allowed to a state in which MPTCP with a WLAN network is allowed is permitted if the determined mobility characteristics, 302, indicates that the condition for MPTCP with a WLAN network is met, 304 and this state is maintained for a period of time 306, 308 defined by a timer. Again, this embodiment may be applicable to the train scenario discussed earlier. Assuming that the wireless terminal is not connected to a WLAN access point on board of a moving train its mobility is Medium or High and MPTCP with a WLAN network is not allowed. If the train stops at a station the mobility characteristics drops to Normal, but only for a very short period of time. If there is a WLAN access point at the station the current mobility characteristics would allow for MPTCP with a WLAN network. However, the stop will be too short and soon after the train departs it will disconnect from the WLAN network. If there is a timer set and after expiry of the timer the mobility still qualifies for MPTCP with a WLAN network then it will be allowed. The timer creates a hysteresis that keeps the wireless terminal in status "MPTCP with a WLAN network not allowed" in order to filter out short and accidental drops in mobility characteristics. In real life when the wireless terminal travels in a car or on a train there will be a number of short stops caused by traffic lights, train stations, etc. With large number of WLAN access points this would result in a larger number of MPTCP attempts when the vehicle carrying the wireless terminal stops in a range of WLAN APs.

Preferably the condition for MPTCP with a WLAN network associated with mobility characteristics of the wireless terminal is set individually for each cell. This means that in each cell the wireless terminal receives System Information Block with a parameter defining a condition for MPTCP with WLAN networks. However, if a new condition for MPTCP with a WLAN network is not received after the wireless terminal roams into a new cell the wireless terminal maintains the condition for MPTCP with a WLAN network received in a previously visited cell. The most likely scenario in which the wireless terminal fails to receive a new condition for MPTCP with a WLAN network is when the wireless terminal roams into a legacy cell that does not support a solution in accordance with embodiments of the present invention.

Figure 4:
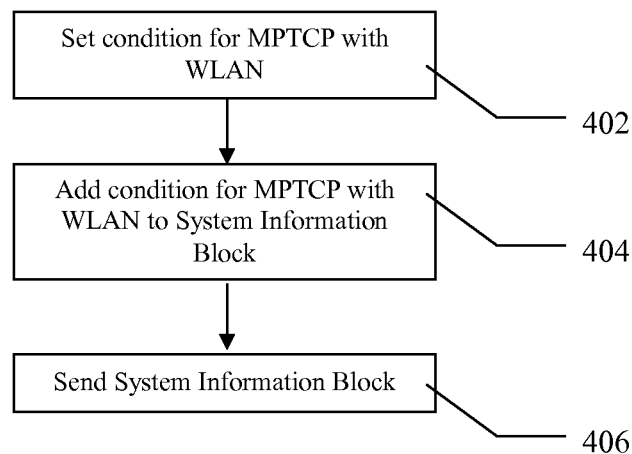
FIG. 4 is a diagram illustrating a method in a network node for controlling use of MPTCP with a WLAN network in one embodiment of the present invention.

With reference to FIG. 4 an embodiment of a method for controlling use of MPTCP with a WLAN network is now to be described. The method is implemented in a node of a 3GPP wireless communications network and the method comprises setting 402 a condition for MPTCP with a WLAN network. The condition is associated with mobility characteristics of a wireless terminal. In a following step the method comprises adding 404 said condition associated with mobility characteristics to a system information block. The node then sends 406 said system information block to a wireless terminal. Said condition associated with mobility characteristics causes disabling MPTCP with a WLAN network if a parameter indicative of mobility characteristics of the wireless terminal indicates that mobility of the wireless terminal is at or above a value defined in the condition, which means that the mobility characteristics of the terminal does not meet the condition.

System Information (SI) and its content is network controlled and it is the provisioning of these parameters defining conditions for MPTCP with a WLAN network in SI which effectively controls this feature.

As discussed earlier, preferably a transition from a state in which MPTCP with a WLAN network is not allowed to a state in which MPTCP with a WLAN network is allowed is permitted if mobility characteristics of the wireless terminal suitable for MPTCP with a WLAN network is maintained for a period of time equal to or longer than a defined threshold. In a preferred embodiment crossing the threshold is controlled by a timer.

Figure 5:
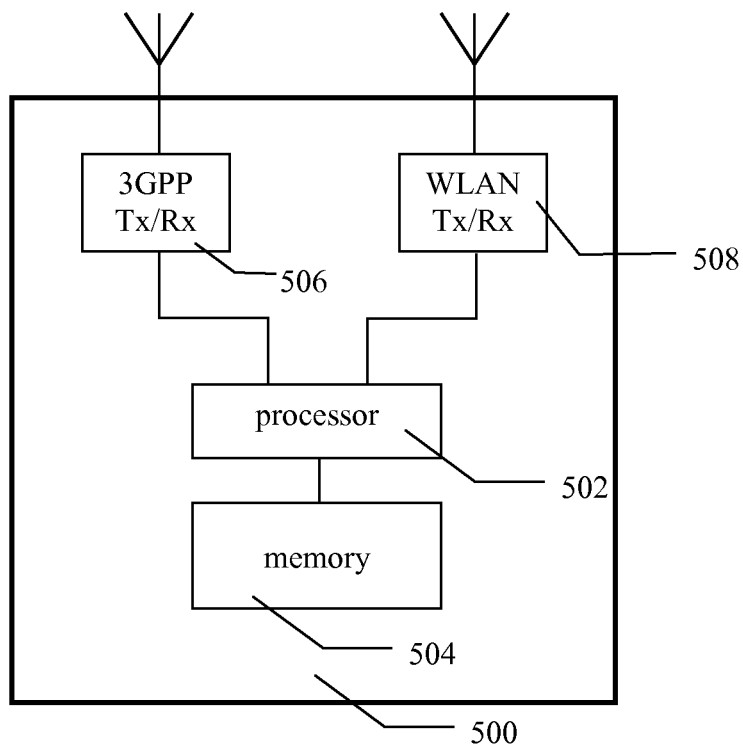
FIG. 5 is a diagram illustrating a wireless terminal in one embodiment of the present invention.

With reference to FIG. 5 an embodiment of a wireless terminal, 500, in accordance with the present invention is presented. The wireless terminal, 500, is configured for operation in a 3GPP wireless communications network. The wireless terminal, 500, comprises a processor, 502, and a memory, 504, wherein said memory contains instructions executable by said processor. The wireless terminal, 500, also comprises a 3GPP transceiver, 506, and a WLAN transceiver 508. By executing the instructions stored in the memory 504 the wireless terminal, 500, is configured to receive system information comprising a condition for MPTCP with a WLAN network, wherein the condition is associated with mobility characteristics of the wireless terminal. In a preferred embodiment the wireless terminal determines a parameter indicative of its mobility characteristics based on 3GPP Technical Specification 36.304. In this embodiment mobility characteristics of the wireless terminal can have one of three values, Normal, Medium or High and it is determined based on a number of cell reselections in a defined period of time. In alternative embodiments mobility characteristics may be determined by measurements or estimations of velocity of the wireless terminal using triangulation or satellite based techniques (e.g. GPS or GLONASS). Once the parameter indicative of mobility characteristics is known the wireless terminal is configured to disable MPTCP with a WLAN network if said parameter indicative of mobility characteristics indicates that mobility of the wireless terminal is at or above a value defined in the condition.

Figure 6:
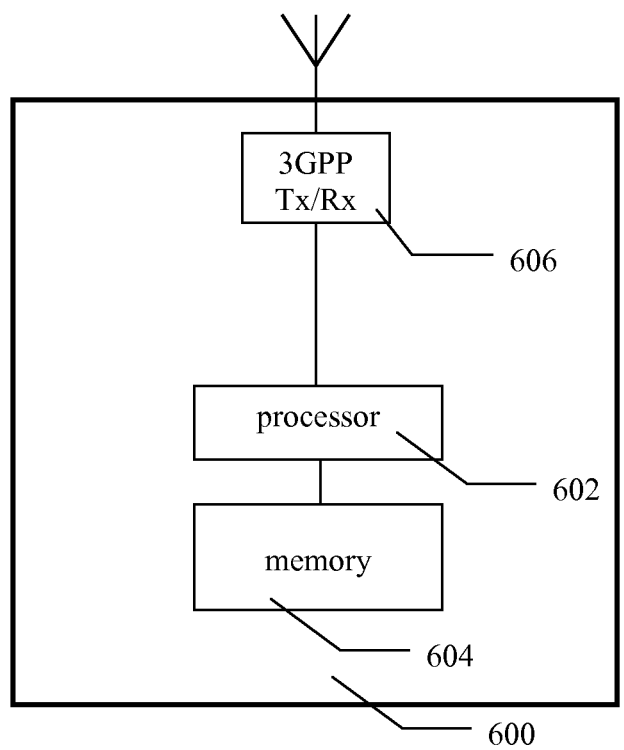
FIG. 6 is a diagram illustrating a network node in one embodiment of the present invention.

A node, 600, for a 3GPP wireless communications network in accordance with an embodiment of the present invention is presented in FIG. 6. The node, 600, is configured for controlling a wireless terminal operating in the 3GPP wireless communications network and using multipoint traffic control protocol (MPTCP) with a Wireless Local Area Network (WLAN). In real life the node controls using MPTCP with WLAN networks by a plurality of wireless terminals, but for the sake of simplicity the description is based on an example of just one wireless terminal. The node comprises a transceiver, 606, a processor, 602, and a memory, 604. Said memory stores instructions executable by said processor. The node 600 is configured to set a condition for the wireless terminal establishing MPTCP with a WLAN network wherein the condition is associated with mobility characteristics of said wireless terminal. The node 600 is further configured to add the condition associated with said mobility characteristics to system information and send the system information to a wireless terminal. When received by the wireless terminal the condition associated with said mobility characteristics causes disabling establishment of MPTCP using the WLAN network if the parameter indicative of mobility characteristics of the terminal does not meet the condition. If the parameter indicative of mobility characteristics of a wireless terminal meets the condition then 3GPP-WLAN MPTCP is allowed for the wireless terminal.

Figure 7:
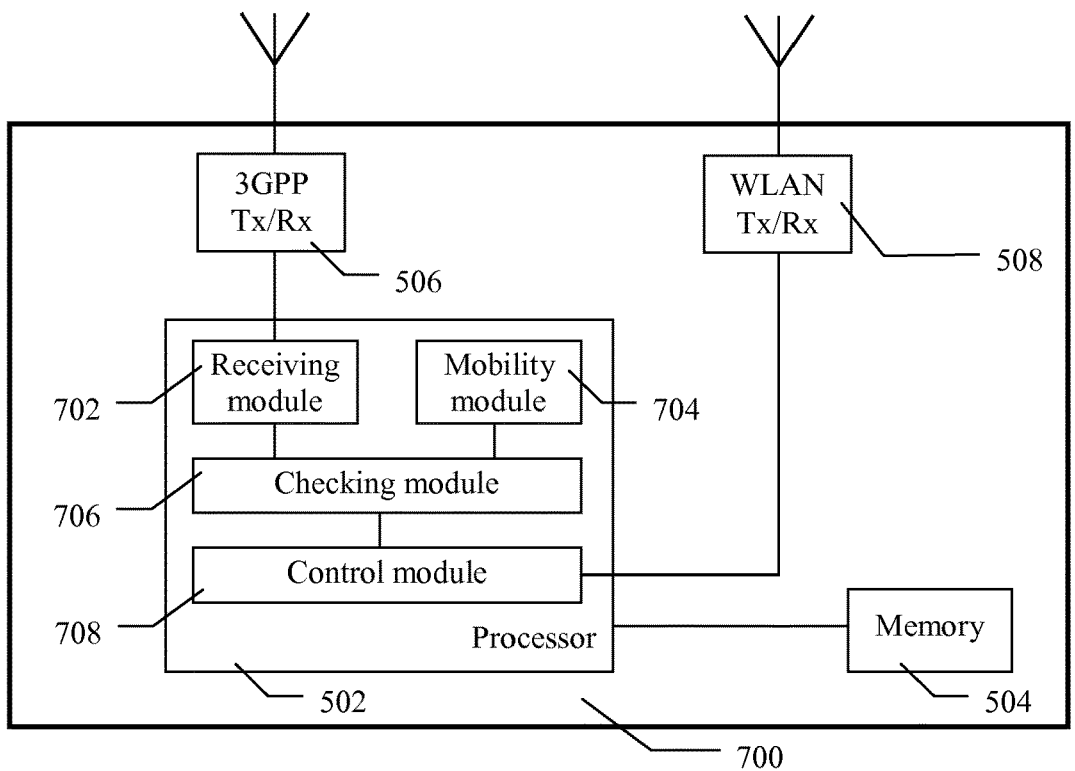
FIG. 7 is a diagram illustrating a wireless terminal in alternative embodiment of the present invention.

Yet another embodiment of a wireless terminal 700 for a 3GPP wireless communications network, in accordance with the present invention, is presented in FIG. 7. The wireless terminal comprises a receiving module 702 configured for receiving system information. The system information comprises a condition for MPTCP with a WLAN network. The parameter is associated with mobility characteristics of the wireless terminal 700. The wireless terminal further comprises a determining module 704 for determining a parameter indicative of mobility characteristics of the wireless terminal 700 and a checking module 706 for checking if the determined parameter indicative of mobility characteristics of the wireless terminal meets the condition for MPTCP with a WLAN network. The wireless terminal also comprises an control module 708 configured for disabling MPTCP with a WLAN network if the parameter indicative of mobility characteristics indicates that mobility of the wireless terminal is at or above a value defined in the condition.

In a preferred embodiment the receiving module 702, determining module 704, checking module 706 and control module 708 are implemented as software modules operating in a processor 502. In alternative embodiments the modules 702-708 may be implemented as hardware modules.

Preferably, the control module 708 is configured to disable scanning frequencies allocated to WLAN networks and in another embodiment said control module is configured to turn off a WLAN transceiver 508 of the wireless terminal 700. However, in order to avoid tearing down existing connections to WLAN networks that may be in operation, in a preferred embodiment the control module 708 is configured to turn off the WLAN transceiver 508 if the wireless terminal 700 is not running a MPTCP session with any WLAN network. This situation may take place when the wireless terminal is on board of a moving train and is connected to an on-board WiFi AP.

Preferably the control module 708 permits transition from a state in which MPTCP with a WLAN network is not allowed to a state in which MPTCP with a WLAN network is allowed if the mobility characteristics suitable for MPTCP with a WLAN network is maintained for a period of time equal to or longer than a defined threshold. This embodiment allows for creating a hysteresis that keeps the wireless terminal in status "MPTCP with a WLAN network not allowed" in order to filter out short and accidental drops in mobility characteristics as discussed earlier.

In yet another embodiment the control module 708 maintains the condition for MPTCP with a WLAN network received in a previous cell of the 3GPP network if a new condition for MPTCP with a WLAN network is not received after the wireless terminal roamed to a new cell of the 3GPP network. As discussed earlier, this may happen when the wireless terminal roams into a legacy cell that does not support a solution in accordance with embodiments of the present invention.

Figure 8:
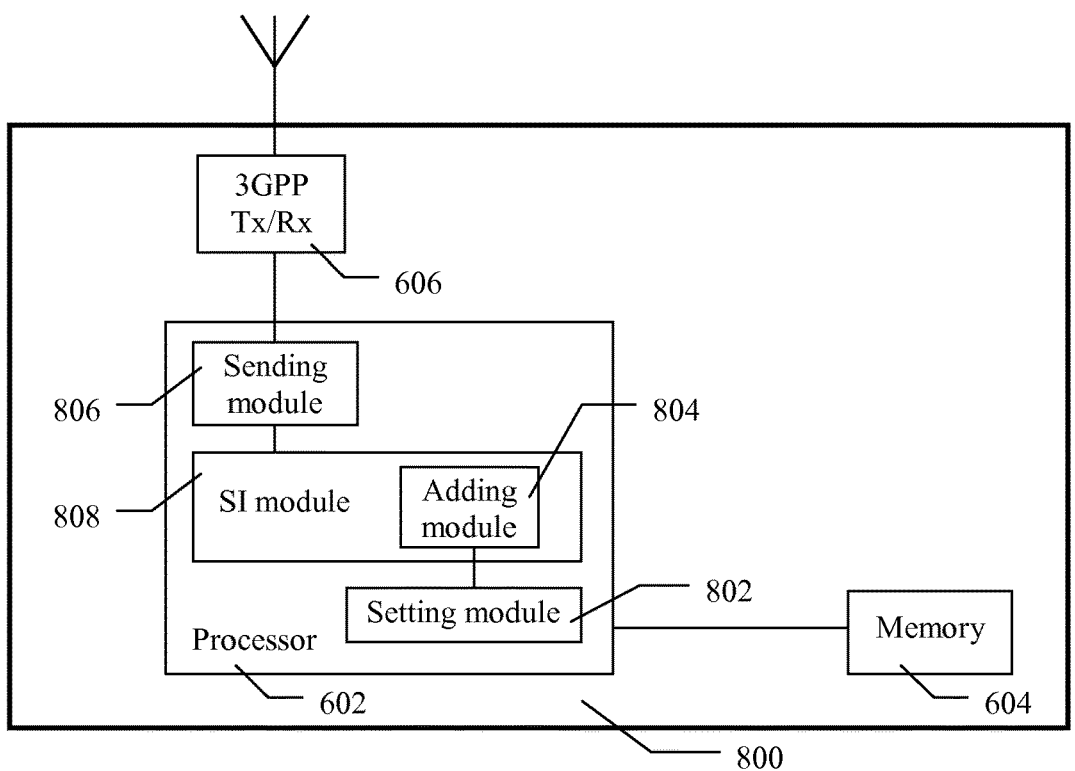
FIG. 8 is a diagram illustrating a network node in alternative embodiment of the present invention.
Figure 9:
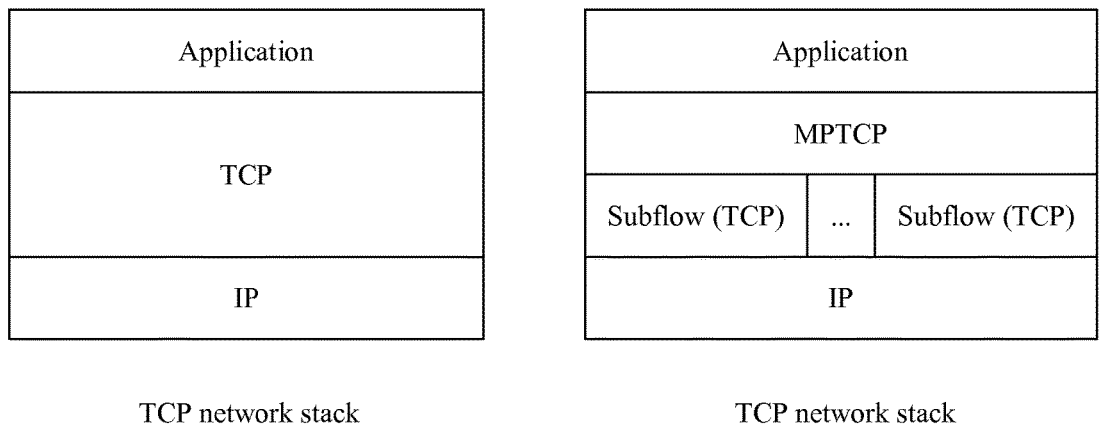
FIG. 9 illustrates network stacks of a TCP and MPTCP connections.
Figure 10:
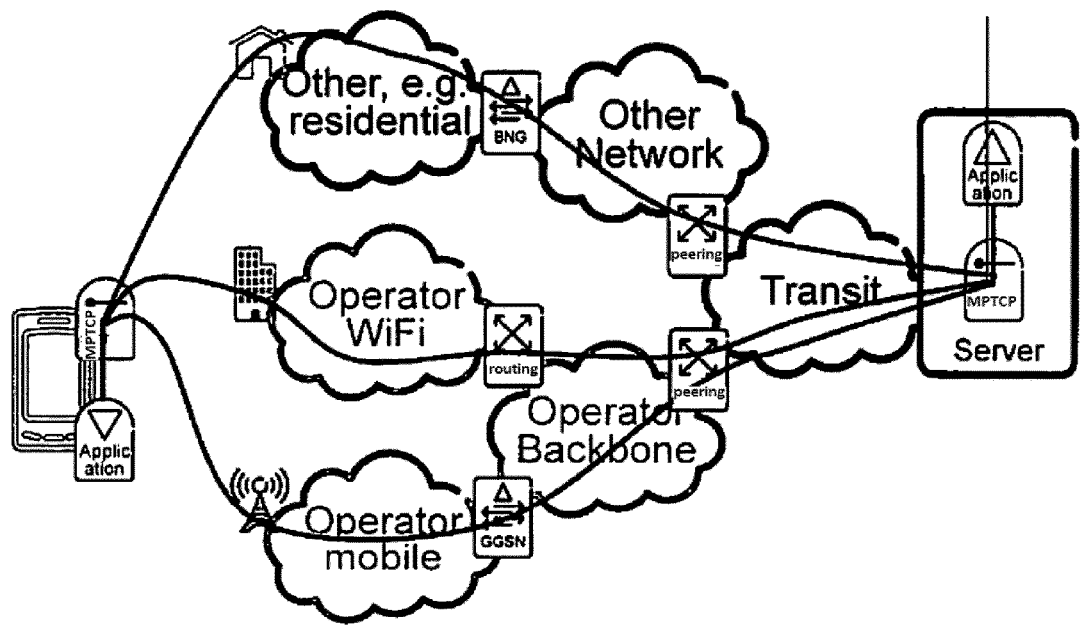
FIG. 10 illustrates an example of a plurality of TCP flows forming MPTCP connection.

Another embodiment of a node 800 for a 3GPP wireless communications network is illustrated in FIG. 8. The node is configured for controlling a wireless terminal operating in the 3GPP wireless communications network and using multipoint traffic control protocol, MPTCP with a Wireless Local Area Network, WLAN. The node comprises a setting module 802 configured for setting a condition for MPTCP with a WLAN network. The parameter is associated with mobility characteristics of a wireless terminal and an adding module 804 for adding the condition for MPTCP with a WLAN network to system information. The node also comprises a sending module 806 for sending said system information to a transceiver 606 of the node 800 for a wireless transmission to a wireless terminal. Said condition associated with mobility characteristics causes disabling 3GPP-WLAN MPTCP if the parameter indicative of mobility characteristics of the wireless terminal indicates that mobility of the wireless terminal is at or above a value defined in the condition. In a preferred embodiment the adding module is part of a module producing System Information (SI module), 808.

In certain embodiments MPTCP with WLAN network may be allowed even for Fast Moving Mobiles (FFM), when the mobility characteristics of a wireless terminal determined based on 3GPP TS36.304 V11.5.0 has value High. This situation may happen when a wireless terminal having mobility value High hands over to a pico or micro cell in a higher floor of a building (higher than a ground floor). Although the mobility of the wireless terminal at this particular time may be High it will not hand over to a cell outside the building from a floor above the ground floor. In this situation the system information may allow for MPTCP with a WLAN network even for wireless terminals having mobility value High.

Although embodiments of the present invention described above are described in the context of a 3GPP wireless terminal using MPTCP with a WLAN network the same solution may be applicable to other access technologies in addition to or instead of WLAN.

While the primary objective of the various embodiments of the present invention is to protect the user experience in deployments using 3GPP-WLAN MPTCP the invention has also the following advantages:

Reduced network signalling as the ping pong effect of moving from one WLAN
AP to another WLAN AP will be avoided.
Battery life in UE will be increased.
Additional low mobility users trying to benefit from MPTCP with a WLAN network will not be blocked (WLAN AP can serve only a limited number of terminals and preventing from connecting those with high mobility preserves the bandwidth for the low mobility users).
Data throughput on WLAN will be increased due to reduced signalling.
In prior art solutions, depending on associated service set identifier (SSID), wireless terminals with mobility above NORMAL and a high SSID priority may be forcing existing WLAN connected users with lower SSID priority off the WLAN if the WLAN access point AP is under load already. This situation will be avoided if 3GPP-WLAN MPTCP is controlled in accordance with embodiments of the present invention.

The invention claimed is:

1. A method in a wireless terminal operating in a 3GPP wireless communications network for controlling the wireless terminal using multipoint traffic control protocol (MPTCP) with a wireless local area network (WLAN), the method comprising:
   receiving, from the 3GPP wireless communications network, system information comprising a condition for the MPTCP with the WLAN network, the condition being associated with mobility characteristics of the wireless terminal;
   determining a parameter indicative of the mobility characteristics of the wireless terminal;
   in response to determining that the parameter indicative of the mobility characteristics of the wireless terminal is at or above a value defined in the condition, not allowing the MPTCP with the WLAN network and disabling the MPTCP with the WLAN network;
   determining current mobility characteristics of the wireless terminal; and
   permitting a transition of the wireless terminal from a state in which the MPTCP with the WLAN network is not allowed to a state in which the MPTCP with the WLAN network is allowed when the current mobility characteristics of the wireless terminal for the MPTCP with the WLAN network are maintained for a period of time equal to or longer than a defined threshold, wherein the state in which the MPTCP with the WLAN network is allowed, a parallel connection of the 3GPP wireless communications network and the WLAN network is established.

2. The method according to claim 1, further comprising disabling scanning frequencies allocated to WLAN networks when the MPTCP with the WLAN networks is not allowed.

3. The method according to claim 1, further comprising turning off a WLAN transceiver of the wireless terminal.

4. The method according to claim 3, wherein the WLAN transceiver of the wireless terminal is turned off if the wireless terminal is not running an MPTCP session with any WLAN network.

5. The method according to claim 1, wherein the condition for the MPTCP with the WLAN network defines a velocity above which the MPTCP with the WLAN network is not allowed.

6. The method according to claim 1, wherein the condition for the MPTCP with the WLAN network associated with the mobility characteristics of the wireless terminal is set individually for each cell of the 3GPP wireless communications network.

7. The method according to claim 1, wherein the wireless terminal maintains the condition for the MPTCP with the WLAN network received in a previous cell if a new condition for the MPTCP with a WLAN network is not received after the wireless terminal is handed over to a new cell of the 3GPP wireless communications network.

8. A method in a node of a 3GPP wireless communications network for controlling a wireless terminal operating in the 3GPP wireless communications network and using multipoint traffic control protocol (MPTCP) with a Wireless Local Area Network (WLAN), the method comprising:
   setting a condition for the MPTCP with the WLAN network, the condition being associated with mobility characteristics of the wireless terminal;
   adding said condition for the MPTCP with the WLAN network to system information; and
   sending said system information to the wireless terminal, wherein said condition associated with said mobility characteristics causes a transition from a state in which the MPTCP with the WLAN network is not allowed to a state in which the MPTCP with the WLAN network is allowed when the mobility characteristics of the wireless terminal for the MPTCP with the WLAN network are maintained for a period of time equal to or longer than a defined threshold, and wherein the state in which the MPTCP with the WLAN network is allowed, a parallel connection of the 3GPP wireless communications network and the WLAN network is established.

9. The method according to claim 8, wherein a parameter indicative of the mobility characteristics of the wireless terminal associated with the received condition is a velocity above which the MPTCP with the WLAN network is not allowed.

10. A wireless terminal for a 3GPP wireless communications network, the wireless terminal comprising a processor and a memory, said memory containing instructions executable by said processor whereby said wireless terminal is configured to:
   receive system information comprising a condition for the wireless terminal using multipoint traffic control protocol (MPTCP) with a wireless local area network (WLAN), the condition being associated with mobility characteristics of the wireless terminal;
   determine a parameter indicative of the mobility characteristics of the wireless terminal;
   in response to the determination that the parameter indicative of the mobility characteristics of the wireless terminal is at or above a value defined in the condition, not allow the MPTCP with the WLAN network and disable the MPTCP with the WLAN network;
   determine current mobility characteristics of the wireless terminal; and permit a transition of the wireless terminal from a state in which the MPTCP with the WLAN network is not allowed to a state in which the MPTCP with the WLAN network is allowed when the current mobility characteristics of the wireless terminal for the MPTCP with the WLAN network are maintained for a period of time equal to or longer than a defined threshold, wherein the state in which the MPTCP with the WLAN network is allowed, a parallel connection of the 3GPP wireless communications network and the WLAN is established.

11. The wireless terminal according to claim 10, further configured to disable scanning frequencies allocated to WLAN networks when the MPTCP with the WLAN networks is not allowed.

12. The wireless terminal according to claim 10, further configured to turn off a WLAN transceiver of the wireless terminal.

13. The wireless terminal according to claim 12, wherein the wireless terminal is configured to turn off the WLAN transceiver if the wireless terminal is not running an MPTCP session with any WLAN network.

14. The wireless terminal according to claim 10, wherein the wireless terminal is configured to maintain the condition for the MPTCP with the WLAN network received in a previous cell if a new condition for the MPTCP with a WLAN network is not received after the wireless terminal is handed over to a new cell of the 3GPP wireless communications network.

15. A node for a 3GPP wireless communications network, the node being configured for controlling a wireless terminal operating in the 3GPP wireless communications network and using multipoint traffic control protocol (MPTCP) with a Wireless Local Area Network (WLAN), the node comprising a processor and a memory, said memory containing instructions executable by said processor, whereby said node is configured to:

set a condition for the MPTCP with the WLAN network, the condition being associated with mobility characteristics of the wireless terminal;

add said condition for the MPTCP with the WLAN network to system information; and send said system information to the wireless terminal, wherein said condition associated with said mobility characteristics causes a transition from a state in which the MPTCP with the WLAN network is not allowed to a state in which the MPTCP with the WLAN network is allowed when the mobility characteristics of the wireless terminal for the MPTCP with the WLAN network are maintained for a period of time equal to or longer than a defined threshold, and wherein the state in which the MPTCP with the WLAN network is allowed, a parallel connection of the 3GPP wireless communications network and the WLAN network is established.

* * * * *